US009319454B2

(12) United States Patent
Nagasaki et al.

(10) Patent No.: US 9,319,454 B2
(45) Date of Patent: Apr. 19, 2016

(54) COMMUNICATION APPARATUS SYSTEM, COMMUNICATION APPARATUS, RELAY APPARATUS, AND CONTROL METHOD OF RELAY

(75) Inventors: Takeshi Nagasaki, Nagoya (JP); Masafumi Miyazawa, Nagoya (JP); Yusuke Shimada, Inazawa (JP); Satoshi Watanabe, Nagoya (JP); Katsuaki Ito, Nagoya (JP); Hirokazu Banno, Iwakura (JP); Kazutaka Yamamoto, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 1198 days.

(21) Appl. No.: 13/291,793

(22) Filed: Nov. 8, 2011

(65) Prior Publication Data
US 2012/0117199 A1    May 10, 2012

(30) Foreign Application Priority Data

Nov. 8, 2010 (JP) ................................. 2010-250315

(51) Int. Cl.
*G06F 15/16* (2006.01)
*H04L 29/08* (2006.01)

(52) U.S. Cl.
CPC ................ *H04L 67/06* (2013.01); *H04L 67/12* (2013.01)

(58) Field of Classification Search
CPC .............................. H04L 67/06; H04L 67/12
USPC ........................................ 709/219, 232, 234
See application file for complete search history.

(56) References Cited

U.S. PATENT DOCUMENTS

2002/0059460 A1* 5/2002 Ishida et al. .................. 709/246
2005/0209927 A1* 9/2005 Aaltonen et al. ................ 705/26
(Continued)

FOREIGN PATENT DOCUMENTS

JP    2005-269250 A    9/2005
WO    2010/014539 A2   2/2010

OTHER PUBLICATIONS

Japan Patent Office, Decision of Refusal for Japanese Patent Application No. 2010-250315 (counterpart Japanese patent application), dispatched Jun. 25, 2013.
(Continued)

*Primary Examiner* — Daniel C Murray
*Assistant Examiner* — Adam Cooney
(74) *Attorney, Agent, or Firm* — Merchant & Gould P.C.

(57) ABSTRACT

A communication apparatus system includes a relay apparatus and a communication apparatus which are connected to a network, to which a service providing apparatus for an electronic-file storing service is connected. The communication apparatus includes: an address-get-request transmitting unit that transmits a request for getting an upload destination address to the relay apparatus; a receiving unit that receives the upload destination address and a template for an upload message from the relay apparatus; an upload-message generating unit that generates the upload message including the electronic file and the upload destination address according to the received template; and an upload-message transmitting unit that transmits the generated upload message to the service providing apparatus to upload the electronic file in the electronic-file storing service. The relay apparatus includes: an upload-destination-address-get-program storage unit; an upload-destination-address getting unit; a time-information adding unit; and an upload-destination-address transmitting unit.

6 Claims, 7 Drawing Sheets

(56) References Cited

U.S. PATENT DOCUMENTS

| | | | |
|---|---|---|---|
| 2010/0205279 A1* | 8/2010 | Takakura | 709/219 |
| 2011/0093535 A1* | 4/2011 | Takakura et al. | 709/203 |
| 2011/0106882 A1 | 5/2011 | Takakura et al. | |
| 2014/0176796 A1* | 6/2014 | Kalajan | 348/552 |

OTHER PUBLICATIONS

Japan Patent Office, Notification of Reason for Refusal for Japanese Patent Application No. 2010-250315 (counterpart Japanese patent application), dispatched Jan. 8, 2013.

* cited by examiner

COMMUNICATION APPARATUS SYSTEM, COMMUNICATION APPARATUS, RELAY APPARATUS, AND CONTROL METHOD OF RELAY

CROSS-REFERENCE TO RELATED APPLICATIONS

This application claims priority from Japanese Patent Application No. 2010-250315 filed on Nov. 8, 2010, the entire subject matter of which is incorporated herein by reference.

TECHNICAL FIELD

The invention relates to a communication apparatus system using a communication apparatus, the communication apparatus, a relay apparatus, and control method of the relay apparatus.

BACKGROUND

There have been known image reading apparatuses for uploading electronic files of read images to servers, print apparatuses for printing electronic files downloaded from servers, and the like. There has been proposed a related-art image reading apparatuses for uploading electronic files of read images to servers. In a case where a maker of the image reading apparatuses or print apparatus provides those services, the maker needs to prepare a dedicated server for storing uploaded electronic files on maker's own.

Meanwhile, recently, electronic-file storing services capable of storing electronic files in databases prepared on networks by server providers are in widespread use. For example, Picasa (a registered trademark) web album and flickr (a registered trademark) are examples of the electronic-file storing services. Users can use terminal devices having web browsers to upload or download desired electronic files in the electronic-file storing services. In many electronic-file storing services, their own application program interfaces (API) are disclosed. Other business operators can use the APIs to provide new services cooperating with the electronic-file storing services to users.

SUMMARY

In the above-described situation, it may be considered to provide services for uploading electronic files of images read by the image reading apparatuses in the electronic-file storing services provided by the service providers, instead of uploading the electronic files to the dedicated servers.

In a case where the makers of the image reading apparatuses provide those services, the image reading apparatuses are required to have programs for using public APIs in the electronic-file storing services. However, the public APIs in the electronic-file storing services may be updated for reasons of the service providers. When an API is updated by service provider's reasons, in order to maintain cooperation between a corresponding electronic-file storing service and image reading apparatuses, the makers of the image reading apparatuses should update programs of the image reading apparatuses owned by users.

Even in a case of adding or erasing an electronic-file storing service capable of cooperating with the image reading apparatuses, it is required to update the programs of the image reading apparatuses owned by the users. In some electronic-file storing services, the image reading apparatuses are required to transmit electronic files with the accompanying timestamps. Here, the timestamps denote the transmission times of the electronic files.

Therefore, illustrative aspects of the present invention provide a communication apparatus system, a communication apparatus, a relay apparatus, a control program of the relay apparatus, and a control method of the relay apparatus which can store electronic files in electronic-file storing services provided by service providers even when the image reading apparatus does not have programs for using public APIs in the electronic-file storing services and a timestamp attaching function, and can suppress the operational cost of the relay apparatus or the equipment investment cost for the relay apparatus.

According to a first aspect of the invention, there is provided a communication apparatus system comprising: a relay apparatus that is connected to a network, to which a service providing apparatus for an electronic-file storing service is connected; and a communication apparatus connected to the network, wherein the communication apparatus comprises: an address-get-request transmitting unit that transmits a request for getting an upload destination address to the relay apparatus, wherein the upload destination address represents an address of an upload destination of an electronic file in the electronic-file storing service; a receiving unit that receives the upload destination address and a template for an upload message from the relay apparatus after the address-get-request transmitting unit transmits the request for getting the upload destination address, wherein the upload message is a message for requesting upload in the electronic-file storing service; an upload-message generating unit that generates the upload message including the electronic file and the upload destination address according to the template received by the receiving unit; and an upload-message transmitting unit that transmits the upload message generated by the upload-message generating unit to the service providing apparatus so as to upload the electronic file in the electronic-file storing service, and wherein the relay apparatus comprises: an upload-destination-address-get-program storage unit that stores an upload-destination-address getting program for getting the upload destination address from the service providing apparatus by using a public API of the electronic-file storing service; an upload-destination-address getting unit which, upon receiving the request for getting the upload destination address from the communication apparatus, gets the upload destination address from the service providing apparatus by executing the upload-destination-address getting program; a time-information adding unit which, upon receiving the request for getting the upload destination address from the communication apparatus, adds information on the reception time of the request for getting the upload destination address to the template for an upload message when necessary; and an upload-destination-address transmitting unit that transmits the template for an upload message and the upload destination address got by the upload-destination-address getting unit to the communication apparatus, after the time-information adding unit adds the information on the reception time of the request for getting the upload destination address to the template for an upload message.

According to a second aspect of the invention, in the communication apparatus system, wherein the time-information adding unit comprises a determining unit that determines whether the information on the reception time of the request for getting the upload destination address is necessary based on the upload destination address got by the upload-destination-address getting unit, and wherein in a case in which the determining unit determines that the information on the reception time of the request for getting the upload destination address is necessary, the time-information adding unit adds the information on the request for getting the upload destination address to the template for an upload message.

According to a third aspect of the invention, in the communication apparatus system, wherein the communication apparatus further comprises: a display unit that displays information; an upload-result receiving unit that receives a response message including an upload result from the service providing apparatus having received the upload message; a decoding-request transmitting unit which, upon receiving the response message by the upload-result receiving unit, transmits a request for decoding the response message to the relay apparatus; a decoding-result receiving unit that receives a decoding result to the relay apparatus after the decoding-request transmitting unit transmits the decoding request; and a display control unit which, upon receiving a sustainable error by the decoding-result receiving unit, displays error information on the display unit after upload is completed, and wherein the relay apparatus further comprises: a decoding-result generating unit which, upon receiving the decoding request from the communication apparatus, decodes the response message included in the decoding request and generates the decoding result to be transmitted to the communication apparatus; and a decoding-result transmitting unit that transmits the decoding result generated by the decoding-result generating unit to the communication apparatus.

According to a fourth aspect of the invention, in the communication apparatus system, wherein the communication apparatus further comprises a remaining-file determining unit that determines whether any electronic file to be transmitted in the electronic-file storing service remains after receiving a response message including an upload result from the service providing apparatus having received the upload message, and wherein if the remaining-file determining unit determines that any electronic file remains, the address-get-request transmitting unit transmits the request for getting the upload destination address to the relay apparatus.

According to a fifth aspect of the invention, in the communication apparatus system, wherein the communication apparatus further comprises: an image reading unit that reads an image recorded on a sheet; and an electronic-file generating unit that generates an electronic file from image data read by the image reading unit.

According to a sixth aspect of the invention, there is provided a communication apparatus in a communication apparatus system that comprises the communication apparatus and a relay apparatus connected to a network including a service providing apparatus for an electronic-file storing service, the communication apparatus comprising: an address-get-request transmitting unit that transmits a request for getting an upload destination address to the relay apparatus, wherein the upload destination address represents an address of an upload destination of an electronic file in the electronic-file storing service; a receiving unit that receives the upload destination address and a template for an upload message from the relay apparatus after the address-get-request transmitting unit transmits the request for getting the upload destination address, wherein the upload message is a message for requesting upload in the electronic-file storing service; an upload-message generating unit that generates the upload message including the electronic file and the upload destination address according to the template received by the receiving unit; and an upload-message transmitting unit that transmits the upload message generated by the upload-message generating unit to the service providing apparatus so as to upload the electronic file in the electronic-file storing service.

According to a seventh aspect of the invention, the communication apparatus further comprises: a display unit that displays information; an upload-result receiving unit that receives a response message including an upload result from the service providing apparatus having received the upload message; a decoding-request transmitting unit which, upon receiving the response message by the upload-result receiving unit, transmits a request for decoding the response message to the relay apparatus; a decoding-result receiving unit that receives a decoding result to the relay apparatus after the decoding-request transmitting unit transmits the decoding request; and a display control unit which, upon receiving a sustainable error by the decoding-result receiving unit, displays error information on the display unit after upload is completed.

According to an eighth aspect of the invention, the communication apparatus further comprises: a remaining-file determining unit that determines whether any electronic file to be transmitted in the electronic-file storing service remains, after receiving a response message including an upload result from the service providing apparatus having received the upload message, wherein in a case in which the remaining-file determining unit determines that any electronic file remains, the address-get-request transmitting unit transmits the request for getting the upload destination address to the relay apparatus.

According to a ninth aspect of the invention, the communication apparatus further comprises: an image reading unit that reads an image recorded on a sheet; and an electronic-file generating unit that generates an electronic file from image data read by the image reading unit.

According to a tenth aspect of the invention, there is provided a relay apparatus in a communication apparatus system comprising a communication apparatus and the relay apparatus connected to a network including a service providing apparatus for an electronic-file storing service, the relay apparatus comprising: an upload-destination-address-get-program storage unit that stores an upload-destination-address getting program for getting the upload destination address from the service providing apparatus by using a public API of the electronic-file storing service; an upload-destination-address getting unit which, upon receiving the request for getting the upload destination address from the communication apparatus, gets the upload destination address from the service providing apparatus by executing the upload-destination-address getting program; a time-information adding unit which, upon receiving the request for getting the upload destination address from the communication apparatus, adds information on the reception time of the request for getting the upload destination address to the template for an upload message when necessary; and an upload-destination-address transmitting unit that transmits the template for an upload message and the upload destination address got by the upload-destination-address getting unit to the communication apparatus, after the time-information adding unit adds the information on the reception time of the request for getting the upload destination address to the template for an upload message.

According to an eleventh aspect of the invention, there is provided a control method of a relay apparatus in a communication apparatus system comprising a communication apparatus and the relay apparatus connected to a network including a service providing apparatus for an electronic-file storing service, the control method comprising: an upload-destination-address-get-program storage step that stores an upload-destination-address getting program for getting the upload destination address from the service providing apparatus by using a public API of the electronic-file storing service; an upload-destination-address getting step which, upon receiving the request for getting the upload destination address from the communication apparatus, gets the upload destination address from the service providing apparatus by executing the upload-destination-address getting program; a time-information adding step which, upon receiving the request for getting the upload destination address from the communication apparatus, adds information on the reception time of the request for getting the upload destination address to the template for an upload message when necessary; and an upload-destination-address transmitting step that transmits the template for an upload message and the upload destination address got by the upload-destination-address getting step to the communication apparatus, after the time-information adding unit adds the information on the reception time of the request for getting the upload destination address to the template for an upload message.

According to a twelfth aspect of the invention, there is provided a non-transitory computer-readable medium having a control program stored thereon and readable by a computer for controlling a relay apparatus in a communication apparatus system comprising a communication apparatus and the relay apparatus connected to a network including a service providing apparatus for an electronic-file storing service, said control program, when executed by the computer, causes the computer to function as: an upload-destination-address-get-program storage unit that stores an upload-destination-address getting program for getting the upload destination address from the service providing apparatus by using a public API of the electronic-file storing service; an upload-destination-address getting unit which, upon receiving the request for getting the upload destination address from the communication apparatus, gets the upload destination address from the service providing apparatus by executing the upload-destination-address getting program; a time-information adding unit which, upon receiving the request for getting the upload destination address from the communication apparatus, adds information on the reception time of the request for getting the upload destination address to the template for an upload message when necessary; and an upload-destination-address transmitting unit that transmits the template for an upload message and the upload destination address got by the upload-destination-address getting unit to the communication apparatus, after the time-information adding unit adds the information on the reception time of the request for getting the upload destination address to the template for an upload message.

According to the communication apparatus system according to the first aspect, the communication apparatus according to the sixth aspect, the relay apparatus according to the tenth aspect, the control method of the relay apparatus according to the eleventh aspect, and the control program of the relay apparatus according to the twelfth aspect, even when the communication apparatus does not have a timer function such as a clock function and a function of generating time information, it is possible to get a template with the accompanying time information and upload electronic files in the electronic-file storing services. In the electronic-file storing services, electronic files can be stored with time information.

According to the communication apparatus system according to the second aspect, since the upload destination addresses are used for identifying the electronic-file storing services, it can be determined from the upload destination addresses whether the electronic-file storing services for uploading electronic files require time information. Therefore, time information may be given to electronic files to be uploaded, if necessary.

According to the communication apparatus system according to the third aspect and the communication apparatus according to the seventh aspect, even when the communication apparatus does not have the public APIs of the electronic-file storing services, it is possible to decode response messages, which are upload results of electronic files, and to display error information of the decoding results on the display unit.

According to the communication apparatus system according to the fourth aspect and the communication apparatus according to the eighth aspect, in a case where there are a plurality of electronic files to be uploaded, time information is given to every electronic file. Therefore, when the plurality of electronic files is consecutively uploaded, since the upload time of each electronic file is consistent with the time information, inconsistency does not occur in time data.

DETAILED DESCRIPTION

Hereinafter, exemplary embodiments of the present invention will be described with reference to the accompanying drawings. The drawings to be referred to are used for explaining technical features usable in the present invention. Configurations of devices, apparatuses, and systems, flow charts of various processes, and the like (which will be described later) are simple explanation examples. They are not intended to limit the present invention.

<Outline of Service Cooperation System 10>

Figure 1:
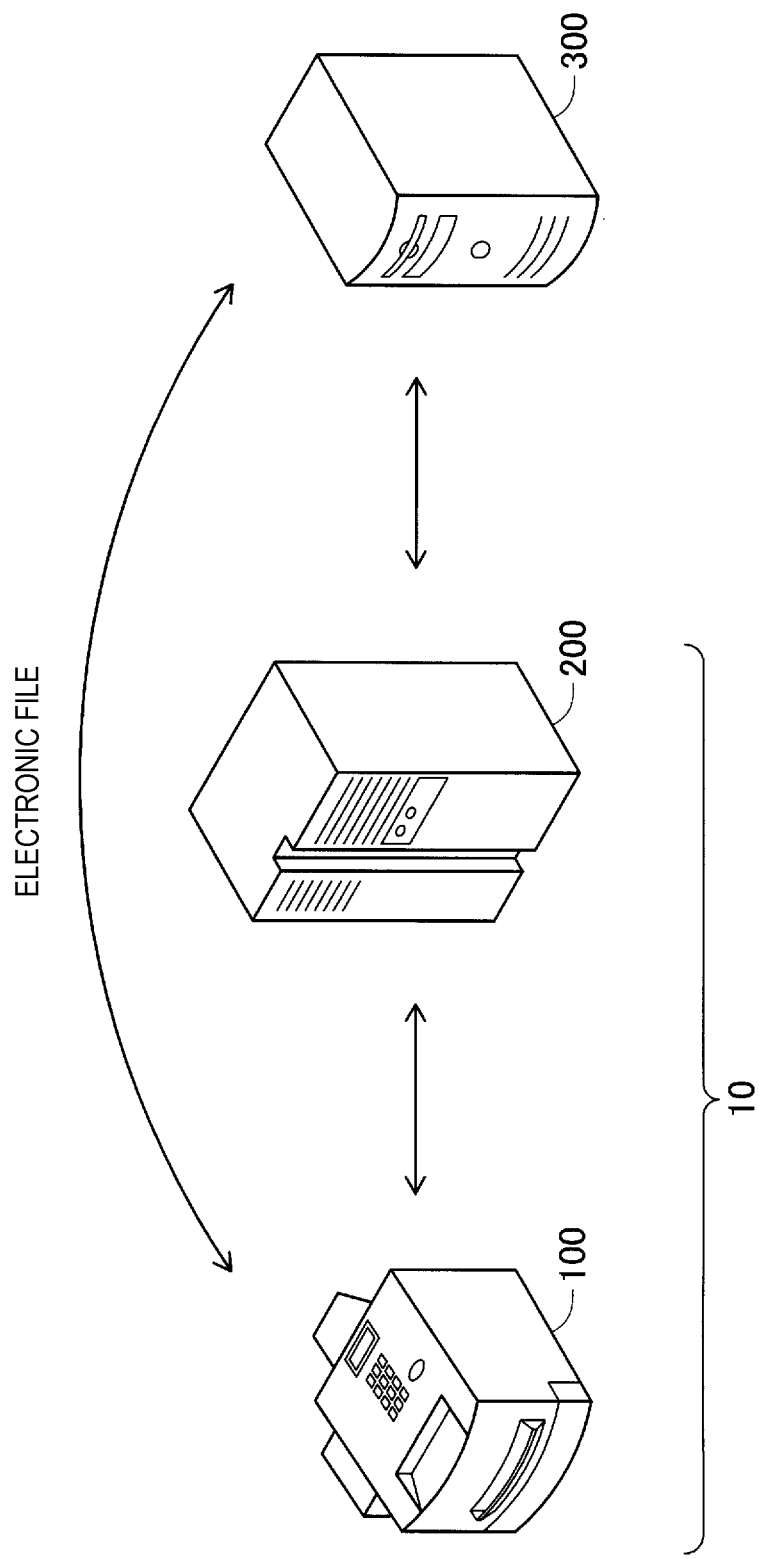
FIG. 1 is a view illustrating an outline of a service cooperation system according to an exemplary embodiment of the invention.

An outline of a service cooperation system 10 according to an exemplary embodiment of the present invention will be described with reference to FIG. 1. The service cooperation system 10 includes a multi-function device 100 and a relay apparatus 200. The service cooperation system 10 can perform upload or download of an electronic file in an electronic-file storing service which a service provider provides.

The electronic-file storing service is provided by a service providing apparatus 300 placed on the Internet by each service provider. Specifically, the service providing apparatus 300 is a known web server. The service providing apparatus 300 communicates with other terminals connected to the Internet on the basis of HTTP or HTTPS so as to provide a predetermined service to the terminals.

The multi-function device 100 is a small-sized digital combined machine. The multi-function device 100 has a print function, a scanner function, a fax function, a copy function, and a function of executing write and read processes on external storage media.

A user of the multi-function device 100 can read images by using the scanner function of the multi-function device 100 and upload electronic files of the read images in the electronic-file storing service.

Further, the user of the multi-function device 100 can download electronic files in the electronic-file storing service, and print the downloaded electronic files by the print function of the multi-function device 100.

The multi-function device 100 uploads or downloads electronic files in cooperation with the relay apparatus 200. The multi-function device 100 obtains URLs in the electronic-file storing service through the relay apparatus 200. The URLs include an upload destination URL which is an URL of an upload destination of an electronic file to the electronic-file storing service, an electronic-file URL which is a URL of an electronic file to be downloaded from the electronic-file storing service, and so on. However, in order to transmit or receive binary data of an electronic file having a large amount of data, the multi-function device 100 communicates directly with the electronic-file storing service without using the relay apparatus 200. Therefore, according to the service cooperation system 10, it is possible to suppress an amount of data passing through the relay apparatus 200. Further, it is possible to suppress a load on the relay apparatus 200.

The relay apparatus 200 may be a known apparatus having a server function. The relay apparatus 200 may also be prepared by a maker of the multi-function device 100. Alternatively, it can also be considered to use, as the relay apparatus 200, a known rental server or a virtual machine which functions as a server in cooperation with a plurality of physical apparatuses as represented by EC2 of Amazon (a registered trademark). In this case, the operational cost of the relay apparatus 200 changes depending to the amount of data passing through the relay apparatus 200 and a load on the relay apparatus 200 for processing. Therefore, in the case of using a rental server or a virtual machine, the operational cost of the relay apparatus 200 can be suppressed by reducing the amount of data passing through the relay apparatus 200 or reducing the load on the relay apparatus 200. Further, even in a case where the relay apparatus 200 is prepared by the maker, since the relay apparatus 200 does not need high processing performance, the equipment investment for the relay apparatus can be suppressed.

<Hardware Configuration of Service Cooperation System 10>

Figure 2:
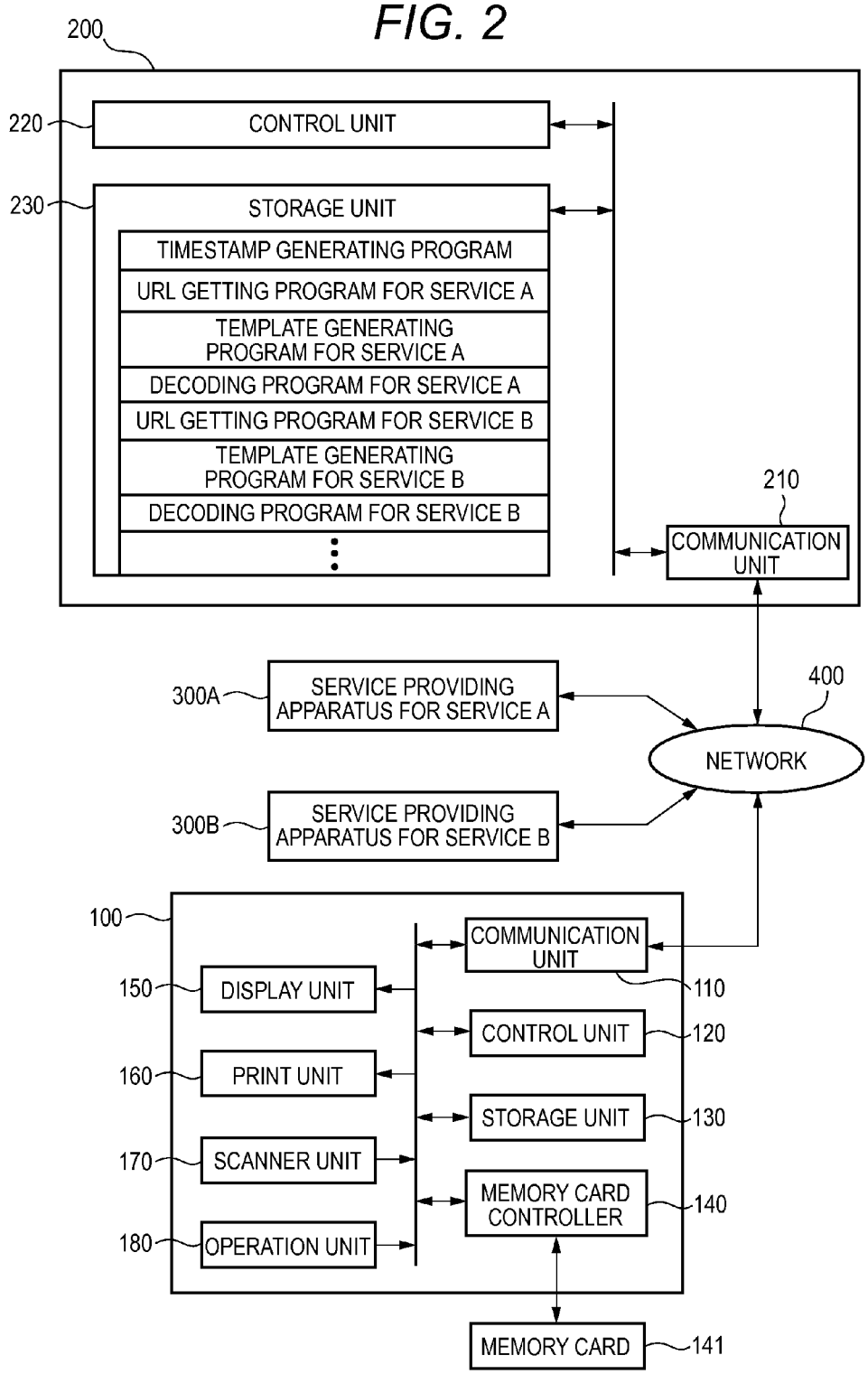
FIG. 2 is a view illustrating a configuration of hardware included in the service cooperation system.

A hardware configuration of the service cooperation system 10 will be described with reference to FIG. 2. The following description will be made on assumption that the service cooperation system 10 performs cooperation of two electronic-file storing services, that is, a service A and a service B. In the following description, a service providing apparatus 300 for the service A is referred to as a service providing apparatus 300A. Also, a service providing apparatus 300 for the service B is referred to as a service providing apparatus 300B. In a case where it is unnecessary to particularly distinguish both sides from each other, the service providing apparatus 300A and the service providing apparatus 300B are generally referred to as the service providing apparatus 300. The multi-function device 100, the relay apparatus 200, the service providing apparatus 300A, and the service providing apparatus 300B are connected to one another through a network 400. As the network 400, for example, an Internet network can be used. The multi-function device 100, the relay apparatus 200, and the service providing apparatus 300 perform data transmission and reception with one another on the basis of HTTP.

First, a hardware configuration of the multi-function device 100 will be described. The multi-function device 100 includes a communication unit 110, a control unit 120, a storage unit 130, a memory card controller 140, a display unit 150, a print unit 160, a scanner unit 170, and an operation unit 180.

The communication unit 110 is a device for performing communication with other devices connected to the network. As the communication unit 110, a known network card can be used.

The control unit 120 includes a CPU, and a ROM and RAM connected to the CPU (not shown). The CPU controls the operation of the multi-function device 100 according to programs stored in the ROM. The RAM is a storage device for temporarily storing various data.

The storage unit 130 is a non-volatile storage device such as a NAND-type flash memory. The storage unit 130 stores user identification information for identifying a user of the multi-function device 100, various set information, etc.

The memory card controller 140 controls the memory of a memory card 141 connected to the multi-function device 100. Specifically, the memory card controller 140 performs writing of data in the memory card 141, erasing of data stored in the memory card 141, reading of data stored in the memory card 141, or the like, on the basis to an instruction of the control unit 120. In the memory card 141, electronic files having a predetermined format are stored.

The display unit 150 is a display device having a display such as a known LCD. The display unit 150 displays predetermined information such as a menu item selection screen (which will be described later), on the basis of an instruction form the control unit 120.

The print unit 160 is a device which prints images according to an instruction of the control unit 120.

The scanner unit 170 is a device that reads images recorded on a sheet set by a user. The scanner unit 170 reads images according to an instruction of the control unit 120.

The operation unit 180 is a device that includes a plurality of operation buttons operable by the user, and transmits signals based on the pushing operation of the user to the control unit 120. The user can input a desired instruction by operating the operation unit 180.

Next, a hardware configuration of the relay apparatus 200 will be described. The description of the present exemplary embodiment will be made on assumption that the relay apparatus 200 is a physically existing server. Incidentally, the relay apparatus 200 may be a virtual machine, such as EC2, which functions as a server in cooperation with a plurality of physical devices as described above.

The relay apparatus 200 includes a communication unit 210, a control unit 220, and a storage unit 230.

The communication unit 210 is a device for performing communication with other devices connected to the network. As the communication unit 210, a known network card can be used.

The control unit 220 includes a CPU, and a ROM and RAM connected to the CPU (not shown). The CPU controls the operation of the relay apparatus 200 according to programs stored in the ROM and the storage unit 230. The RAM is a storage device for temporarily storing various data.

The storage unit 230 is a non-volatile storage device such as a hard disk drive. The storage unit 230 stores a plurality of software modules including a URL getting program for the service A, a template generating program for the service A, a decoding program for the service A, a URL getting program for the service B, a template generating program for the service B, a decoding program for the service B, and a timestamp generating program. Further, the storage unit 230 stores a relay program (not shown) for relaying communication between the multi-function device 100 and the service providing apparatus 300 in cooperation with the plurality of modules.

The URL getting program for the service A is a program for getting an upload destination URL from the service providing apparatus 300A by using an API provided in the service A. The template generating program for the service A is a program for generating templates for upload messages for uploading electronic files in the service A. The decoding program for the service A is a program for decoding response messages from the service providing apparatus 300A.

The URL getting program for the service B is a program for getting an upload destination URL from the service providing apparatus 300B by using an API provided in the service B. The template generating program for the service B is a program for generating templates for upload messages for uploading electronic files in the service B. The decoding program for the service B is a program for decoding response messages from the service providing apparatus 300B.

The timestamp generating program is a program for generating information on transmission times of electronic files in the service A or B. The template generating program for the service A and the template generating program for the service B embed timestamps in templates for upload messages. The timestamp generating program may get time information from a clock function of the relay apparatus. Alternatively, the timestamp generating program may communicate with an external server based on the network time protocol (NTP) to get time information.

The user of the multi-function device 100 can designate a desired service of a plurality of electronic-file storing services. Then, the user of the multi-function device 100 can upload desired electronic files in the designated service. Further, the user of the multi-function device 100 can select whether to upload an electric file of an image read by the scanner unit 170 or to upload an existing electronic file stored in the memory card 141.

<Operation of Service Cooperation System 10>

Figure 3:
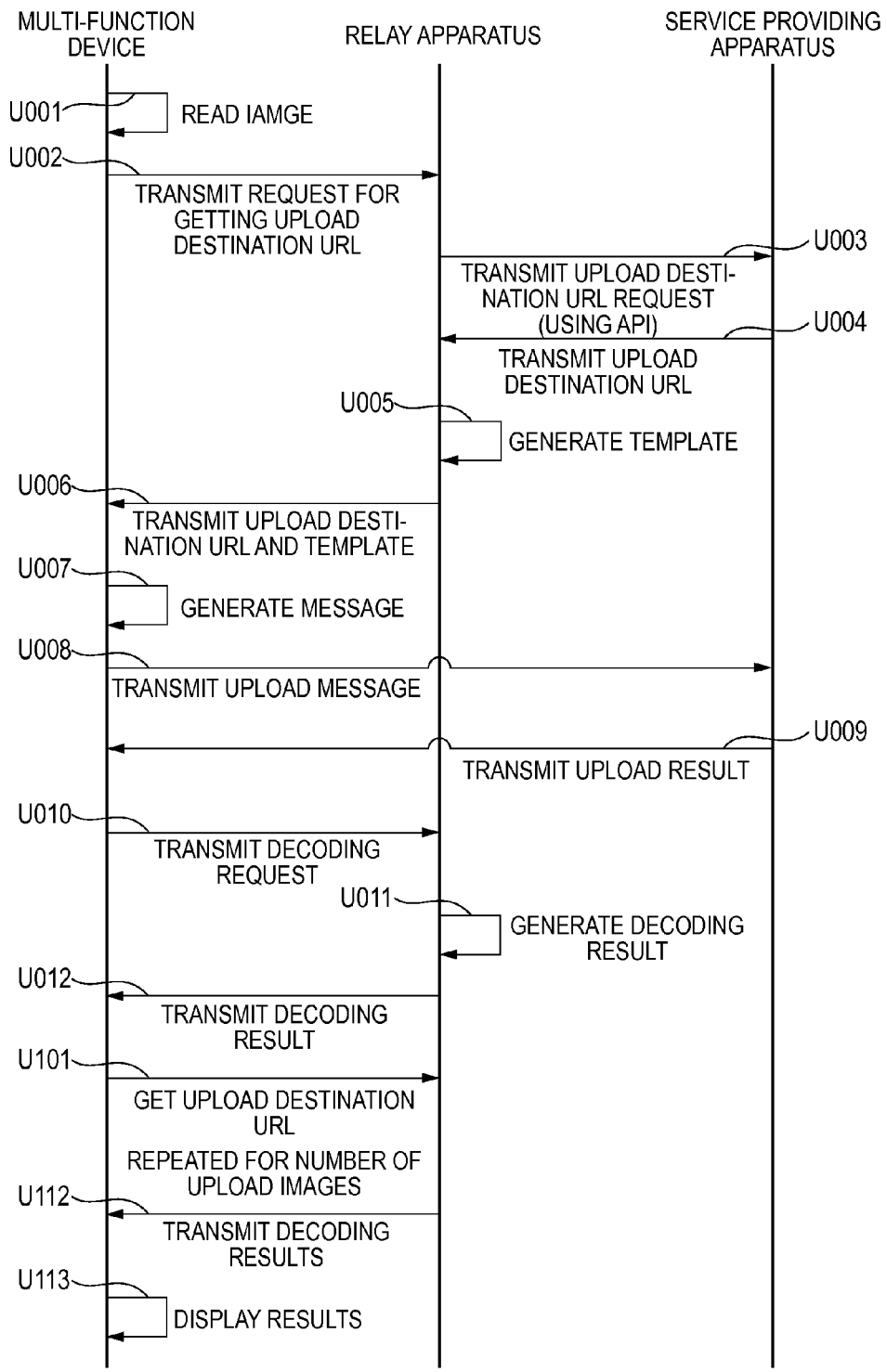
FIG. 3 is a view illustrating an example of an operation of the service cooperation system.

Next, an example of the operation of the service cooperation system 10 will be described with reference to FIG. 3. FIG. 3 is a sequence diagram illustrating an example of the operation of the service cooperation system 10. In this example, a flow in a case where the user of the multi-function device 100 selects upload of an electronic file of an image read by the scanner unit 170 will be described. Incidentally, it is apparent that it is possible to upload electronic files stored in the memory card 141. In the following description, the electronic-file storing service is simply referred to as the service.

First, if the user operates the operation unit 180 of the multi-function device 100 so as to select a service to be used for electronic-file upload, in step U001, the multi-function device 100 controls the scanner unit 170 to read an image and generate an electronic file of the read image by the control unit 120. Next, in step U102, the multi-function device 100 transmits a request for getting an upload destination URL to the relay apparatus 200. The request for getting an upload destination URL includes service identification information for identifying the service selected by the user, and user identification information for identifying the user.

Upon receiving the request for getting an upload destination URL, in step U003, the relay apparatus 200 transmits an upload destination URL request to the service providing apparatus 300 for the service selected by the user. The relay apparatus 200 identifies the service and the user on the basis of the service identification information and the user identification information included in the request for getting an upload destination URL received from the multi-function device 100. Then, the relay apparatus 200 generates an upload destination URL request corresponding to the service and the user, and transmits the upload destination URL request to the service providing apparatus 300. In this case, the relay apparatus 200 generates the upload destination URL request in accordance with a program corresponding to the service designated by the user.

Specifically, if the user has designated the service A, the relay apparatus 200 executes the URL getting program for the service A stored in the storage unit 230 so as to generate an upload destination URL request corresponding to the service A, and transmits the upload destination URL request to the service providing apparatus 300A. The generated upload destination URL request is an HTTP message using the public API in the service A. APIs for getting upload destination URLs are different for each service. For this reason, the relay apparatus 200 has programs for generating upload destination URL requests according to each service. Specifically, the relay apparatus 200 has the URL getting program for the service A for generating upload destination URL requests for the service A, and the URL getting program for the service B for generating upload destination URL requests for the service B. The relay apparatus 200 uses the URL getting programs so as to generate upload destination URL requests corresponding to each service.

Information included in the generated upload destination URL requests depends on the type of service. In a case where, in order to identify an upload destination URL, the service side requires information, such as an album ID, for identifying an electronic-file storage position in the service, an album ID of an album being used by the user is included in the upload destination URL request. Further, in a case where, in order to identify an upload destination URL, the service side requires information, such as a file name, for identifying an electronic-file storage position in the service, a file name being used by the user is included in the upload destination URL request. Additional information such as the album ID or file name being used by the user is stored in the storage unit 230 in advance. The relay apparatus 200 uses required information to generate upload destination URL requests according to each service.

Upon receiving the upload destination URL request, in step U004, the service providing apparatus 300 transmits a URL corresponding to the upload destination URL request as an upload destination URL to the relay apparatus 200.

In step U002, the relay apparatus 200 having received the request for getting an upload destination URL generates a timestamp denoting the reception time of the request for getting an upload destination URL. Then, the relay apparatus 200 having received the request for getting an upload destination URL transmits an upload destination URL request to the service providing apparatus 300, and generates a template for an upload message to be transmitted from the multi-function device 100 to the service providing apparatus 300 in step U005. In templates, timestamps may be embedded depending on the type of service that is an access destination. The upload message is a message for requesting upload in the electronic-file storing service.

The relay apparatus 200 uses a program corresponding to each service designated by the user so as to generate a template according to the corresponding service. The contents of upload messages to be transmitted to the service providing apparatus 300 depend on the type of service. Specifically, an upload message is an HTTP request message. Information to be written in a header, information to be written in a request body, and an amount of information depend on the type of service. For example, some types of services may require, as information to be written in a header, a timestamp which is information representing the file transmission time. If a service receives an upload message, the service compares a timestamp embedded in the header and the reception time. Then, the service uses the comparison result to find out a data transmission error or interception on the communication path. Some services may need to write not only binary data of an electronic file but also information such as the file name of the electronic file in a request body, and some services may need to write only binary data of an electronic file in a request body, and write information such as the file name of the electronic file in a header.

In order to generate templates appropriate for various services, the relay apparatus 200 has programs for generating templates for each service. Specifically, the relay apparatus 200 has the template generating program for the service A, and the template generating program for the service B.

After getting the upload destination URL in step U004 and generating the template for an upload message in step U005, the relay apparatus 200 transmits the upload destination URL received from the service providing apparatus 300 and the generated template to the multi-function device 100 in step U006.

In step U007, the multi-function device 100 generates an upload message on the basis of the template got from the relay apparatus 200. The generated upload message includes the upload destination URL got from the relay apparatus 200 and the binary data of the electronic file of the read image. The multi-function device 100 can generate an upload message according to each service only by storing binary data of an electronic file, an upload destination address, and a data size of the electronic file at predetermined positions of a template received from the relay apparatus 200.

After generating the upload message, in step U008, the multi-function device 100 transmits the upload message to the service providing apparatus 300 for the service selected by the user. In this way, the user of the multi-function device 100 can upload electronic files of desired images in desired services.

Upon receiving the upload message, in step U009, the service providing apparatus 300 transmits a response message representing an upload result to the multi-function device 100. The multi-function device 100 receives the response message including the upload result form the service providing apparatus 300. The contents of response messages also depend on the types of services. Therefore, the multi-function device 100 is unable to decode the response message. The upload result is information representing whether the electronic file has been normally uploaded. In a case where the electronic file has been normally uploaded, information representing the ID of the electronic file is also included in the upload result.

Since the multi-function device 100 is unable to decode the response message, at this rate, the multi-function device 100 is unable to display the upload result on the display unit 150. For this reason, the multi-function device 100 transmits a decoding request to the relay apparatus 200 in step U010, so as to make the relay apparatus 200 decode the response message. In a message of the decoding request, the entire response message received by the multi-function device 100 is stored.

Upon receiving the decoding request, the relay apparatus 200 generates a decoding result of the response message in step U011. Specifically, the relay apparatus 200 extracts the upload result included in the response message, and generates, as a decoding result, a message which includes the upload result and has a format decodable in the multi-function device 100. The decoding result is generated on the basis of a program corresponding to the service designated by the user. Specifically, in a case where the service designated by the user is the service A, the relay apparatus 200 generates the decoding result on the basis of the decoding program for the service A stored in the storage unit 230. Further, in a case where the service designated by the user is the service B, the relay apparatus 200 generates the decoding result on the basis of the decoding program for the service B stored in the storage unit 230.

After generating the decoding result, the relay apparatus 200 transmits the generated decoding result to the multi-function device 100 in step U012.

If there are electronic data of images read by the scanner unit 170, other than the uploaded electronic file, in the storage unit 130, the multi-function device 100 transmits the request for getting an upload destination URL again in step U101, and repeats the same operations as those in steps U002 to U012 for a number of electronic data of images to be uploaded (U101 to U112). Here, with respect to each electronic file, a timestamp is got and is embedded in a template in step U004, which makes it possible to reduce a time difference between the get time of the upload destination URL and the transmission time of the corresponding electronic file represented by the timestamp. Therefore, it is possible to prevent an error from being detected by the upload destination service.

Then, if upload of the electronic files of all images is completed and the multi-function device 100 receives decoding results of all the electronic files, the multi-function device 100 displays upload results included in the received decoding results in step U113. This enables the user to check whether the upload has succeeded. In a case where the upload has succeeded, it is possible to confirm where the uploaded electronic files have been stored.

The above description based on the flow chart is absolutely an example, and does not limit the present invention. For example, in a case of a service like flickr (a registered trademark) requiring an electronic file to be mapped with a predetermined album after being uploaded, the relay apparatus 200 performs the following process in step U011. The relay apparatus 200 having received the decoding request decodes the response message received from the service providing apparatus 300 and transmits an instruction to map the uploaded electronic file with a predetermined album to the service providing apparatus 300. Then, the relay apparatus 200 may transmit, to the multi-function device 100, information representing that the electronic file has been uploaded to the album mapped with the electronic file by the service providing apparatus 300, in place of the decoding result.

<Operation of Multi-Function Device 100>

Figure 4:
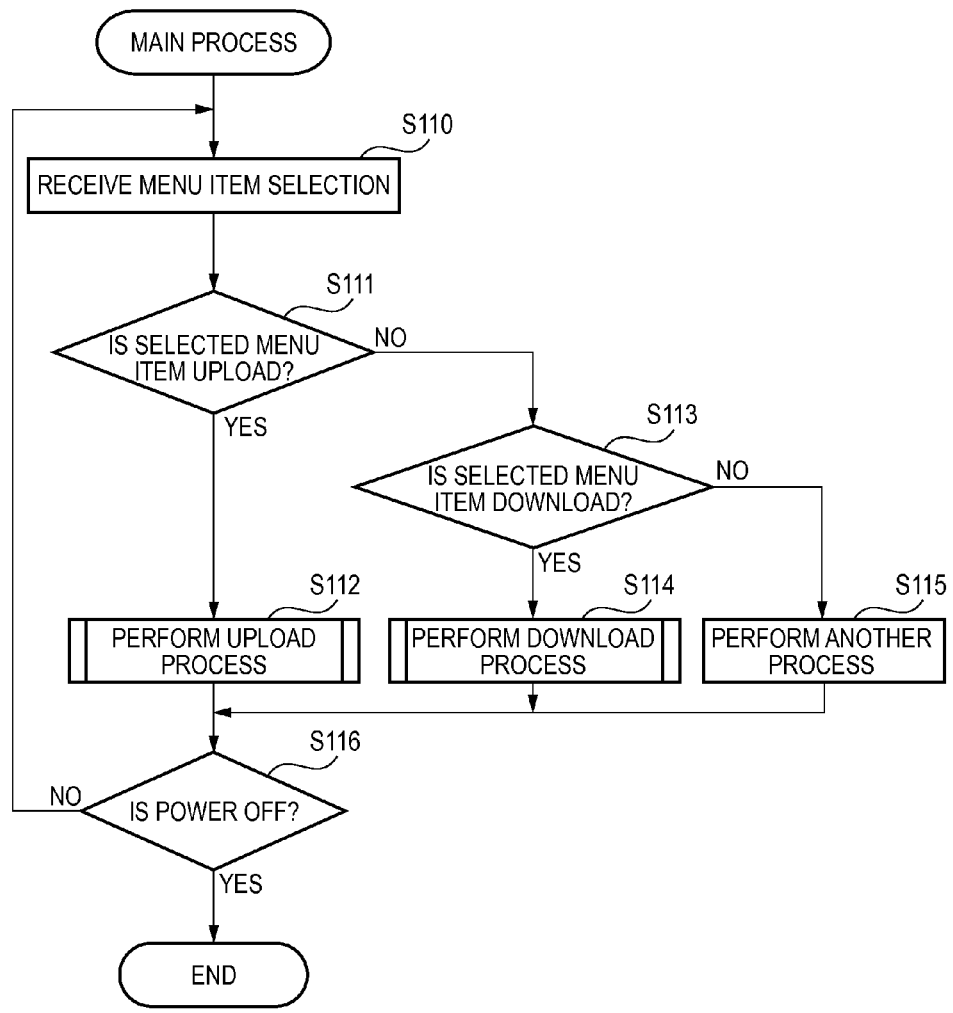
FIG. 4 is a flow chart illustrating an operation (main process) of a multi-function device.
Figure 5:
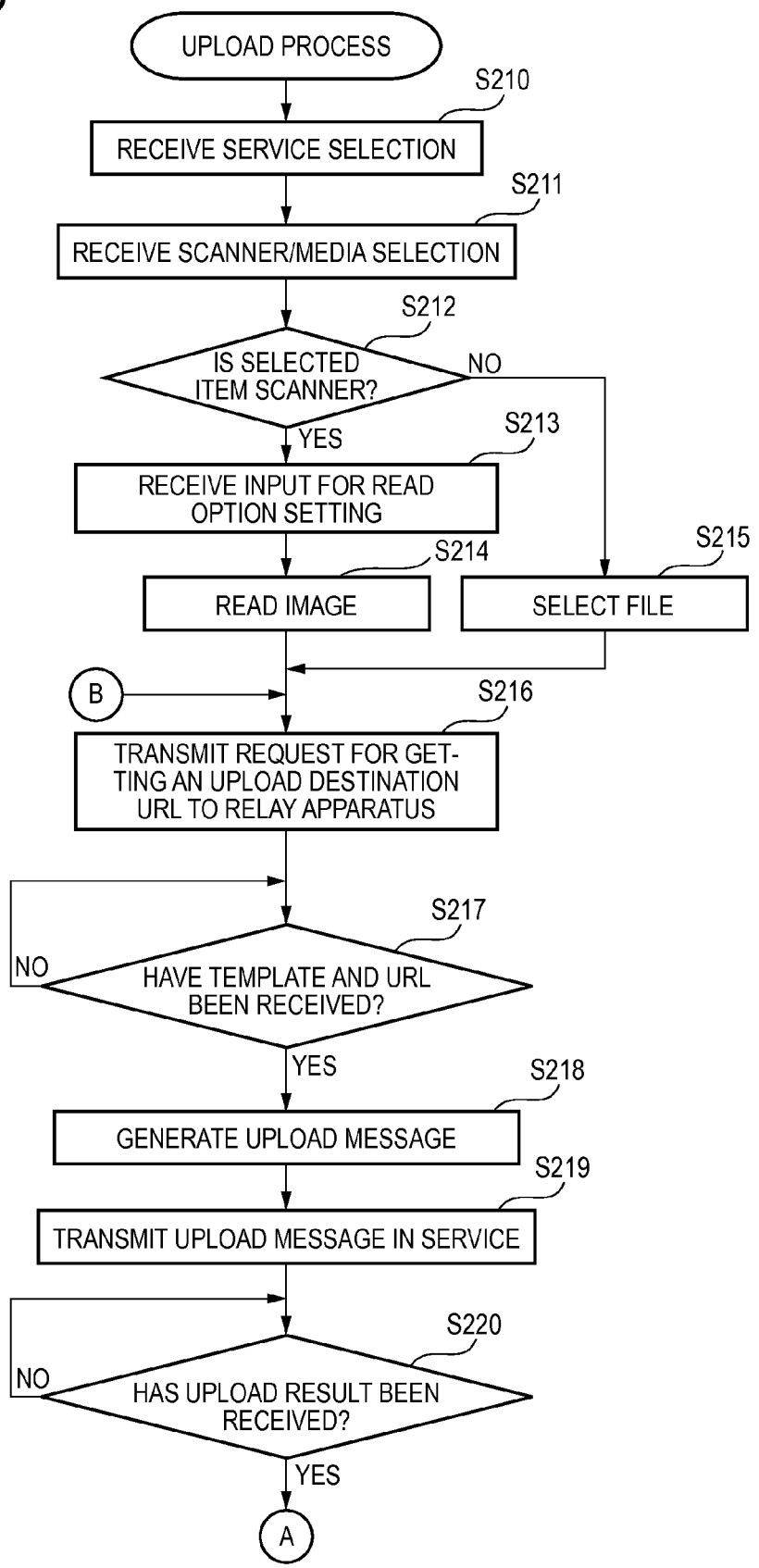
FIG. 5 is a flow chart illustrating an operation (the first half of an upload process) of the multi-function device.
Figure 6:
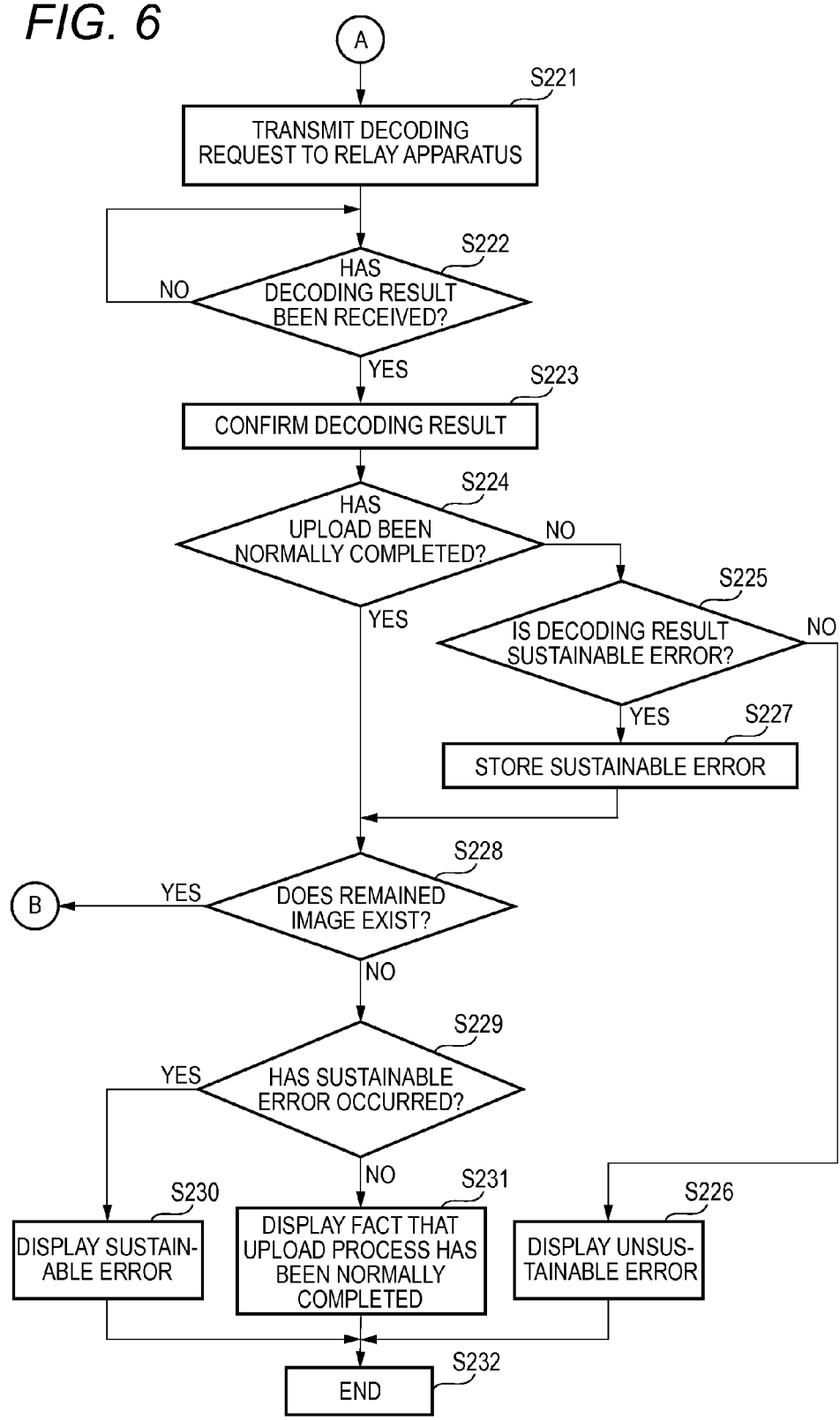
FIG. 6 is a flow chart illustrating an operation (the second half of an upload process) of the multi-function device.

Next, a detailed operation of the multi-function device 100 will be described with reference to FIGS. 4 to 6. If power of the multi-function device 100 is turned on, the control unit 120 of the multi-function device 100 starts a main process shown in FIG. 4 in accordance with a predetermined program stored in the ROM.

First, in step S110, the control unit 120 displays a menu item selection screen on the display unit 150, and receives a menu item selection from the user. A plurality of menu items are displayed on the menu item selection screen. The user can select a desired menu item by operating the operation unit

180. The plurality of menu items includes at least menu items of 'UPLOAD' and 'DOWNLOAD'.

The menu item 'UPLOAD' is a menu item that is selected for uploading a desired electronic file in an electronic-file storing service. Further, the menu item 'DOWNLOAD' is a menu item that is selected for downloading a desired electronic file in the electronic-file storing service.

After receiving the menu item selection from the user, in step S111, the control unit 120 determines whether the selected menu item is 'UPLOAD' or not.

In a case where the selected menu item is 'UPLOAD' (Yes in step S111), in step S112, the control unit 120 performs an upload process (which will be described later).

In a case where the selected menu item is not 'UPLOAD' (No in step S111), in step S113, the control unit 120 determines whether the selected menu item is 'DOWNLOAD' or not.

In a case where the selected menu item is 'DOWNLOAD' (Yes in step S113), in step S114, the control unit 120 performs a download process. The download process is a process for downloading an electronic file in the service selected by the user.

In a case where the selected menu item is not 'DOWNLOAD' (No in step S113), in step 115, the control unit 120 performs another process according to the menu item selection.

After performs any one of steps S112, S114, and S115, in step S116, the control unit 120 determines whether the user has performed operation for turning off, or not. In a case where the user has not performed the operation for turning off the power (No in step S116), the control unit 120 returns to the step S110 and repeats the processes of steps S110 to S115. In a case where the user has performed the operation for turning off (Yes in step S116), the control unit 120 turns off the power of the multi-function device 100 and ends the main process.

Next, the upload process will be described in detail with reference to FIGS. 5 and 6. If the upload process starts, in step S210, the control unit 120 displays a service selection screen on the display unit 150, and receives a selection of a desire service from the user. In the present exemplary embodiment, the user can select a desired service from the service A and service B. If the user selects any service, the control unit 120 stores the service identification information for identifying the service selected by the user, in the RAM.

After receiving the service selection, in step S211, the control unit 120 displays a scanner/media selection screen on the display unit 150 to enable the user to select a method of uploading the electronic file. On the scanner/media selection screen, items 'SCANNER' and 'MEDIA' are displayed as selection items for the upload method. The item 'SCANNER' is an item for reading an image printed on a sheet by the scanner unit 170 and uploading an electronic file of the image in the service. Meanwhile, the item 'MEDIA' is an item for selecting a desired electronic file from electronic files stored in advance in the memory card 141 and uploading the selected electronic file in the service.

In a case where the item 'SCANNER' is selected by the user (Yes in step S212), in step S213, the control unit 120 displays an input screen for read option setting on the display unit 150 and receives an input for read option setting from the user. The read option setting means setting on various options such as whether to read the image printed on the sheet in color or monochrome, and a resolution to be used for reading.

If the user sets a predetermined sheet with an image recorded thereon in the scanner unit 170 and pushes a read start button of the operation unit 180, in step S214, the control unit 120 controls the scanner unit 170 to read the image recorded on the sheet, and generates an electronic file of the read image. At this time, the scanner unit 170 performs reading according to the options set in step S213.

Meanwhile, in a case where the item 'MEDIA' is selected by the user (No in step S212), in step S215, the control unit 120 displays a file selection screen enabling the user to select a desired electronic file from the electronic files stored in the memory card 141, and receives an electronic file selection from the user.

After step S214 or S215, in step S216, the control unit 120 transmits the request for getting an upload destination URL to the relay apparatus 200. As described above, the request for getting an upload destination URL includes the service identification information and the user identification information. As the service identification information, the service identification information stored in the RAM in step S210 may be used. It is assumed that the storage unit 130 stores the user identification information for identifying the user of the multi-function device 100 in advance. As the user identification information of the request for getting an upload destination URL, the user identification information stored in the storage unit 130 may be used. In a case where a plurality of users share one multi-function device 100, if a user selects the menu item 'UPLOAD', the control unit 120 may perform a login process on the user by a known method so as to identify the user that is operating the multi-function device 100 on the basis of the user identification information.

After transmitting the request for getting an upload destination URL, in step S217, the control unit 120 determines whether the template for an upload message and the upload destination URL have been received from the relay apparatus 200, which has transmitted the request for getting an upload destination URL in step S216, or not.

In a case where the template and the upload destination URL have not been received from the relay apparatus 200 (No in step S217), the control unit 120 stands by until the template and the upload destination URL are received.

In a case where the template and the upload destination URL have been received from the relay apparatus 200 (Yes in step S217), in step S218, the control unit 120 generates the upload message on the basis of the received template, the received upload destination URL, and either the electronic file generated in step S214 or the electronic file selected in step S215. The upload message is generated as described with respect to step U008.

After generating the upload message, in step S219, the control unit 120 transmits the upload message to the service providing apparatus 300 for the service selected by the user.

Next, in step S220, the control unit 120 determines whether the response message representing the upload result has been received from the service providing apparatus 300.

In a case where the upload result has not been received from the service providing apparatus 300 (No in step S220), the control unit 120 stands by until the upload result is received.

In a case where the upload result has been received from the service providing apparatus 300 (Yes in step S220), in step S221, the control unit 120 transmits the decoding request to the relay apparatus 200. As described above, the decoding request includes the response message received from the service providing apparatus 300. Further, the decoding request includes the service identification information for identifying the service selected by the user.

Next, in step S222, the control unit 120 determines whether the decoding result has been received from the relay apparatus 200. In a case where the decoding result has not been received from the relay apparatus 200 (No in step S222), the control unit 120 stands by until the decoding result is received.

In a case where the decoding result has been received from the relay apparatus 200 (Yes in step S222), in step S223, the control unit 120 confirms the received decoding result. In a case where the decoding result represents that the upload has not been normally completed (No in step S224), in step S225, the control unit 120 determines whether the decoding result is a sustainable error or an unsustainable error. Here, an unsustainable error may be an error occurring when a trouble occurs in the service providing apparatus 300 or the network 400 such that the communication with the service providing apparatus 300 is not normally performed. And, a sustainable error may be an error occurring when an uploaded electronic file cannot be normally transmitted for any reasons although the communication with the service providing apparatus 300 is being normally performed.

If the decoding result transmitted from the relay apparatus 200 is an unsustainable error (No in step S225), in step S226, the control unit 120 controls the display unit 150 to display the fact that an unsustainable error has occurred, on the basis of the decoding result. Then, in step S232, the upload process ends. If it is determined in step S225 that the decoding result is a sustainable error (Yes in step S225), in step S227, the control unit 120 controls the storage unit 130 to store the fact that a sustainable error has occurred. Then, the control unit 120 proceeds to step S228 (which will be described later).

If it is determined in step S224 that the decoding result represents that the upload has been normally completed (Yes in step S224), in step S228, the control unit 120 determines whether there is another image read by the scanner unit 170 and whether another electronic file to be uploaded is in the memory card 141. If an electronic file of another image read by the scanner unit 170 exists or another electronic file to be uploaded is in the memory card 141 (Yes in step S228), the control unit 120 proceeds to step S216. In other words, if it is determined that any electronic file to be transmitted to the electronic-file storing service remains (Yes in step S228), the control unit 120 proceeds to step S216. If there is no image read by the scanner unit 170 and any electronic file to be uploaded is not in the memory card 141 (No in step S228), in step S229, the control unit 120 confirms the storage unit 130 and determines whether a sustainable error has occurred. If a sustainable error has occurred (Yes in step S229), in step S230, the control unit 120 controls the display unit 150 to display the fact that a sustainable error has occurred. Then, in step S232, the upload process ends. If it is determined in step S229 that any sustainable error has not occurred (No in step S229), the control unit 120 controls the display unit 150 to display the fact that the upload process has been normally completed in step S231, and ends the upload process in step S232.

<Operation of Relay Apparatus 200>

Figure 7:
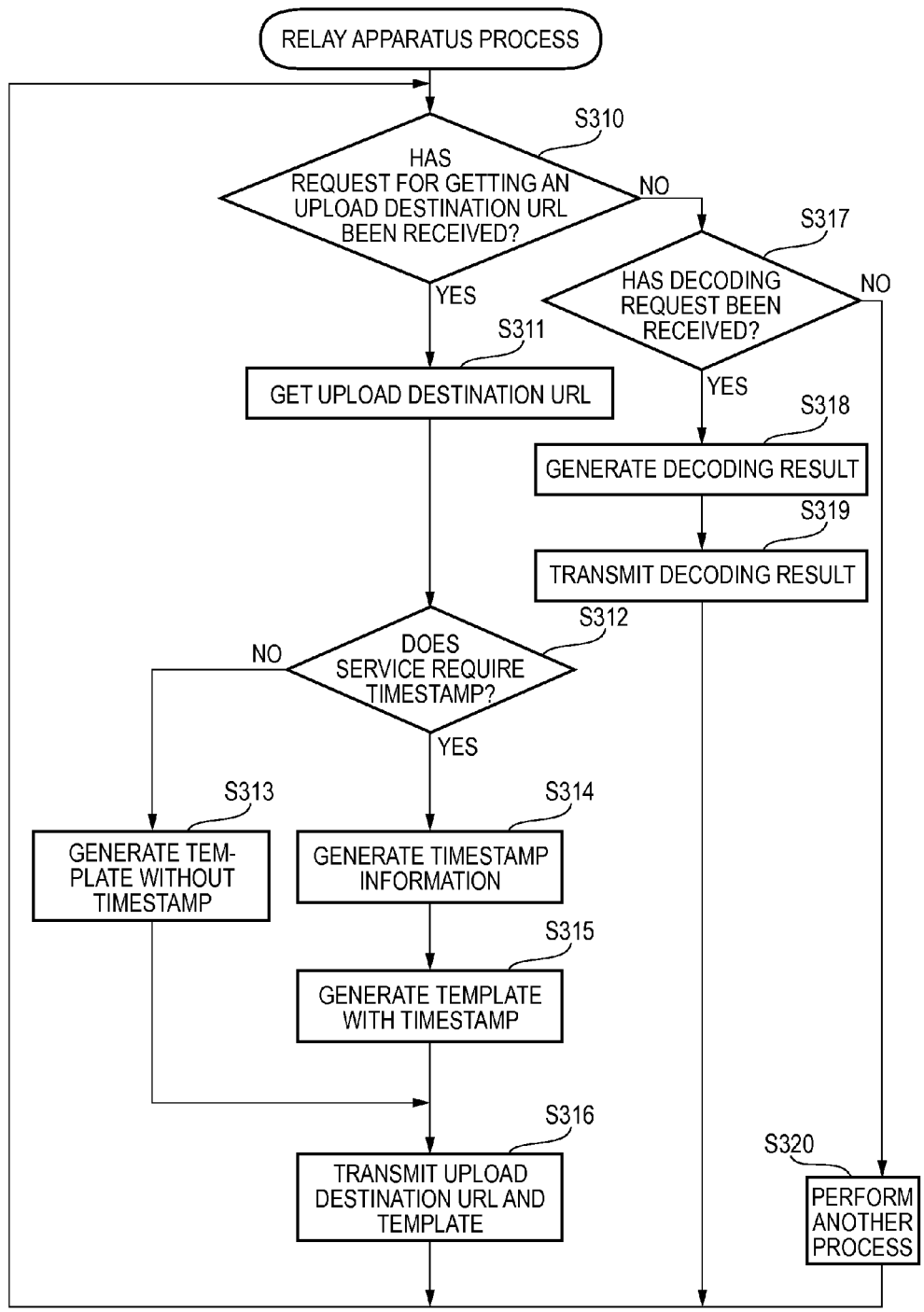
FIG. 7 is a flow chart illustrating an operation of a relay apparatus.

Next, a detailed operation of the relay apparatus 200 will be described with reference to FIG. 7. If the relay program stored in the storage unit 230 starts to be executed, the control unit 220 of the relay apparatus 200 starts a relay apparatus process shown in FIG. 7 in accordance with various programs stored in the storage unit 230.

If the relay apparatus process starts, first, in step S310, the control unit 220 determines whether the request for getting an upload destination URL has been received from the multi-function device 100.

In a case where it is determined that the request for getting an upload destination URL has been received (Yes in step S310), in step S311, the control unit 220 gets the upload destination URL from the service providing apparatus 300. Specifically, as described with respect to step U002, the control unit 220 executes the program corresponding to the service identification information included in the request for getting an upload destination URL so as to transmit the upload destination URL request to the service providing apparatus 300, thereby getting the upload destination URL.

After getting the upload destination URL, in step S312, the control unit 220 determines whether it is required to embed a timestamp in a template for an upload message for the service selected by the user. If the control unit 220 determines that it is unnecessary to embed a timestamp (No in step S312), the control unit 220 generates a template for an upload message corresponding to the service selected the user in step S313, without performing embedding a timestamp, and proceeds to step S316, which will be described later. If the control unit 220 determines in step S312 that it is required to embed a timestamp in a template (Yes in step S312), in step S314, the control unit 220 generates a timestamp by using the timestamp generating program stored in the storage unit 230. Then, the control unit 220 generates a template for an upload message corresponding to the service selected by the user and embeds the generated timestamp in step S315. The template is generated as described with respect to step U004.

Next, the control unit 220 transmits the upload destination URL received from the service providing apparatus 300, and the generated template to the multi-function device 100 in step S316, and returns to step S310.

If it is determined in step S310 that the request for getting an upload destination URL has not been received (No in step S310), in step S317, the control unit 220 determines whether the decoding request has been received from the multi-function device 100.

If it is determined that the decoding request has been received from the multi-function device 100 (Yes in step S317), in step S318, the control unit 220 generates the decoding result on the basis of the response message included in the decoding request. At this time, the control unit 220 generates the decoding result according to the program corresponding to the service selected by the user, as described above. The control unit 220 can identify the service selected by the user, on the basis of the service identification information included in the decoding request.

After generating the decoding result, the control unit 220 transmits the generated decoding result to the multi-function device 100 in step S319, and returns to step S310.

In a case where it is determined in step S317 that the decoding request has not been received (No in step S317), the control unit 120 performs another process in step S320, and returns to step S310. When the multi-function device 100 downloads a desired image in the service, the relay apparatus 200 may perform a process for relaying the communication between the multi-function device 100 and the service providing apparatus 300 as a specific example of another process.

As described above, according to the service cooperation system 10, it is possible to upload electronic files of images read by the scanner unit 170 in a desired service. Further, since the electronic files do not pass through the relay apparatus 200, it is possible to suppress the operational cost of the relay apparatus 200.

The relay apparatus 200 can be connected with a plurality of multi-function devices 100 to make the plurality of multi-function devices 100 and the service cooperate with each other. The business operator providing the service cooperation system to the users can maintain cooperation with other services only by updating the programs, using the APIs, of the relay apparatus 200, if necessary. Further, in a service requiring timestamps to be embedded in templates for upload messages, the relay apparatus 200 generates timestamps on reception times of requests for getting upload destination URLs, and embeds the timestamps in templates, which makes the cooperation between the multi-function device 100 and the service possible. Furthermore, whenever one electronic file is uploaded, a timestamp may be generated and embedded in a template, so as to reduce a difference between the time represented by the timestamp and the time when the multi-function device 100 actually transmits an upload message.

The service providing apparatus 300 in the exemplary embodiment is one example of a service providing apparatus of the invention. The relay apparatus 200 in the exemplary embodiment is one example of a relay apparatus of the invention. The scanner unit 170 in the exemplary embodiment is one example of an image reading unit of the invention. The multi-function device 100 in the exemplary embodiment is one example of a communication apparatus of the invention. The service cooperation system 10 in the exemplary embodiment is one example of a communication apparatus system of the invention. The control unit 120 that performs step S214 in the exemplary embodiment is one example of an electronic-file generating unit of the invention. The control unit 120 that performs step S216 in the exemplary embodiment is one example of an address-get-request transmitting unit of the invention. The control unit 120 that performs step S218 in the exemplary embodiment is one example of an upload-message generating unit of the invention. The control unit 120 that performs step S219 in the exemplary embodiment is one example of an upload-message transmitting unit of the invention. The storage unit 230 in the exemplary embodiment is one example of an upload-destination-address-get program storage unit of the invention. The control unit 220 that performs step S311 in the exemplary embodiment is one example of an upload-destination-address getting unit of the invention. The control unit 220 that performs step S316 in the exemplary embodiment is one example of an upload-destination-address transmitting unit of the invention. The control unit 220 that performs step S315 in the exemplary embodiment is one example of a time-information adding unit of the invention. The display unit 150 in the exemplary embodiment is one example of a display unit described of the invention. The control unit 120 that performs step S221 in the exemplary embodiment is one example of a decoding-request transmitting unit of the invention. The control unit 120 that performs steps S226, S230, and S231 in the exemplary embodiment is one example of a display control unit of the invention. The control unit 220 that performs step S318 in the exemplary embodiment is one example of a decoding-result generating unit of the invention. The control unit 220 that performs step S319 in the exemplary embodiment is one example of a decoding-result transmitting unit of the invention. The control unit 120 that performs step S217 in the exemplary embodiment is one example of a receiving unit of the invention. The control unit 220 that performs step S312 in the exemplary embodiment is one example of a determining unit of the invention. The control unit 120 that performs process when Yes in step S220 in the exemplary embodiment is one example of an upload-result receiving unit of the invention. The control unit 120 that performs process when Yes in step S222 in the exemplary embodiment is one example of a decoding-result receiving unit of the invention. The control unit 120 that performs step S228 in the exemplary embodiment is one example of a remaining-file determining unit of the invention.

It is apparent that the invention is not limited to the above-described exemplary embodiments, but may be variously modified without departing from the scope of the invention.

In the above-described exemplary embodiment, a URL is used as an upload destination address. However, the present invention is not limited thereto.

In the above-described exemplary embodiment, in step S312 of the relay apparatus process, the control unit 220 of the relay apparatus 200 generates a template. However, the present invention is not limited thereto. For example, templates corresponding to each service may be stored in the storage unit 230 in advance, and the relay apparatus 200 may transmit a corresponding template to the multi-function device 100.

In the above-described exemplary embodiment, in step S221 of the upload process, the multi-function device 100 transmits the decoding request to the relay apparatus 200. However, the present invention is not limited thereto. For example, steps S221 to S223 may be skipped.

In the above-described exemplary embodiment, the additional information necessary for the upload destination URL request is stored in the relay apparatus 200 in advance. However, the present invention is not limited thereto. For example, whenever it is required to generate the upload destination URL request, the relay apparatus 200 may inquire of the multi-function device 100 about the necessary additional information. The multi-function device 100 receiving the inquiry about the additional information may display an additional information inquiry screen on the display unit 150 so as to enable the user to perform additional information input or selection. Then, the multi-function device 100 may transmit the additional information input or selected by the user, to the relay apparatus 200. Therefore, the relay apparatus 200 can identify the necessary additional information. In this case, the relay apparatus 200 may generate the inquiry screen corresponding to each service, in a markup language such as XML. This is because the kind of the additional information that the user should input or select depends on the type of service. The relay apparatus 200 may transmit a message of the inquiry screen generated in the markup language such as XML, to the multi-function device 100. The multi-function device 100 may perform rendering on the basis of the received message, thereby capable of displaying the inquiry screen corresponding to the service designated by the user. The multi-function device 100 may further include a driver for performing rendering on messages written in markup languages such as XML, so as to be able to display an inquiry screen according to the type of service. Then, the user can input or select the additional information according to the type of service. This interactive process may be performed not only before the upload destination URL request is transmitted but also before any request message is transmitted from the relay apparatus 200 to the service providing apparatus 300, whereby it is possible to easily perform cooperation with various services.

What is claimed is:
1. A communication apparatus system comprising:
a relay apparatus that is connected to a network, to which a service providing apparatus for an electronic-file storing service is connected; and
a communication apparatus connected to the network,
wherein the communication apparatus comprises:
an address-get-request transmitting unit configured to transmit a request for getting an upload destination address to the relay apparatus, wherein the upload destination address represents an address of an upload destination of an electronic file in the electronic-file storing service;

a receiving unit configured to receive the upload destination address and a template for an upload message from the relay apparatus after the address-get-request transmitting unit transmits the request for getting the upload destination address, wherein the upload message is a message for requesting upload in the electronic-file storing service;

an upload-message generating unit configured to generate the upload message including the electronic file and the upload destination address according to the template received by the receiving unit; and an upload-message transmitting unit configured to transmit the upload message generated by the upload-message generating unit to the service providing apparatus so as to upload the electronic file in the electronic-file storing service; and a remaining-file determining unit configured to determine whether any electronic file to be transmitted in the electronic-file storing service remains after receiving a response message including an upload result from the service providing apparatus having received the upload message, wherein in a case in which the remaining-file determining unit determines that any electronic file remains, the address-get-request transmitting unit transmits the request for getting the upload destination address to the relay apparatus, and wherein the relay apparatus comprises:

an upload-destination-address-get-program storage unit that stores an upload-destination-address getting program for getting the upload destination address from the service providing apparatus by using a public API of the electronic-file storing service;

an upload-destination-address getting unit configured to, every time when receiving the request for getting the upload destination address from the communication apparatus, get the upload destination address from the service providing apparatus by executing the upload-destination-address getting program;

a time-information adding unit configured to, every time when receiving the request for getting the upload destination address from the communication apparatus, determine whether the information on the reception time of the request for getting the upload destination address is necessary based on the upload destination address got by the upload-destination-address getting unit; and in a case that it is determined that the information on the reception time of the request for getting the upload destination address is necessary, add information on the reception time of the request for getting the upload destination address to the template for an upload message when necessary; and an upload-destination-address transmitting unit configured to transmit the template for an upload message and the upload destination address got by the upload-destination-address getting unit to the communication apparatus, every time after the time-information adding unit adds the information on the reception time of the request for getting the upload destination address to the template for an upload message.

2. The communication apparatus system according to claim 1, wherein the communication apparatus further comprises:

a display unit configured to display information;

an upload-result receiving unit configured to receive a response message including an upload result from the service providing apparatus having received the upload message;

a decoding-request transmitting unit configured to, upon receiving the response message by the upload-result receiving unit, transmit a request for decoding the response message to the relay apparatus;

a decoding-result receiving unit configured to receive a decoding result from the relay apparatus after the decoding-request transmitting unit transmits the decoding request; and a display control unit configured to, upon receiving a sustainable error by the decoding-result receiving unit, display error information on the display unit after upload is completed, and wherein the relay apparatus further comprises:

a decoding-result generating unit configured to, upon receiving the decoding request from the communication apparatus, decode the response message included in the decoding request and generates the decoding result to be transmitted to the communication apparatus; and a decoding-result transmitting unit configured to transmit the decoding result generated by the decoding-result generating unit to the communication apparatus.

3. The communication apparatus system according to claim 1, wherein the communication apparatus further comprises:

an image reading unit configured to read an image recorded on a sheet; and an electronic-file generating unit configured to generate an electronic file from image data read by the image reading unit.

4. A relay apparatus in a communication apparatus system comprising a communication apparatus and the relay apparatus connected to a network including a service providing apparatus for an electronic-file storing service, the communication apparatus including: an address-get-request transmitting unit configured to transmit a request for getting an upload destination address to the relay apparatus, wherein the upload destination address represents an address of an upload destination of an electronic file in the electronic-file storing service; a receiving unit configured to receive the upload destination address and a template for an upload message from the relay apparatus after the address-get-request transmitting unit transmits the request for getting the upload destination address, wherein the upload message is a message for requesting upload in the electronic-file storing service; an upload-message generating unit configured to generate the upload message including the electronic file and the upload destination address according to the template received by the receiving unit; an upload-message transmitting unit configured to transmit the upload message generated by the upload-message generating unit to the service providing apparatus so as to upload the electronic file in the electronic-file storing service; and a remaining-file determining unit configured to determine whether any electronic file to be transmitted in the electronic-file storing service remains after receiving a response message including an upload result from the service providing apparatus having received the upload message, wherein in a case in which the remaining-file determining unit determines that any electronic file remains, the address-get-request transmitting unit transmits the request for getting the upload destination address to the relay apparatus, the relay apparatus comprising:

an upload-destination-address-get-program storage unit that stores an upload-destination-address getting program for getting the upload destination address from the service providing apparatus by using a public API of the electronic-file storing service;

an upload-destination-address getting unit configured to, every time when receiving the request for getting the upload destination address from the communication apparatus, gets the upload destination address from the service providing apparatus by executing the upload-destination-address getting program;

a time-information adding unit configured to, every time when receiving the request for getting the upload destination address from the communication apparatus, determine whether the information on the reception time of the request for getting the upload destination address is necessary based on the upload destination address got by the upload-destination-address getting unit, and in a case that it is determined that the information on the reception time of the request for getting the upload destination address is necessary, add information on the reception time of the request for getting the upload destination address to the template for an upload message when necessary; and an upload-destination-address transmitting unit configured to transmit the template for an upload message and the upload destination address got by the upload-destination-address getting unit to the communication apparatus, every time after the time-information adding unit adds the information on the reception time of the request for getting the upload destination address to the template for an upload message.

5. A control method of a relay apparatus in a communication apparatus system comprising a communication apparatus and the relay apparatus connected to a network including a service providing apparatus for an electronic-file storing service, the communication apparatus including: an address-get-request transmitting unit configured to transmit a request for getting an upload destination address to the relay apparatus, wherein the upload destination address represents an address of an upload destination of an electronic file in the electronic-file storing service; a receiving unit configured to receive the upload destination address and a template for an upload message from the relay apparatus after the address-get-request transmitting unit transmits the request for getting the upload destination address, wherein the upload message is a message for requesting upload in the electronic-file storing service; an upload-message generating unit configured to generate the upload message including the electronic file and the upload destination address according to the template received by the receiving unit; an upload-message transmitting unit configured to transmit the upload message generated by the upload-message generating unit to the service providing apparatus so as to upload the electronic file in the electronic-file storing service; and a remaining-file determining unit configured to determine whether any electronic file to be transmitted in the electronic-file storing service remains after receiving a response message including an upload result from the service providing apparatus having received the upload message, wherein in a case in which the remaining-file determining unit determines that any electronic file remains, the address-get-request transmitting unit transmits the request for getting the upload destination address to the relay apparatus, the control method of the relay apparatus comprising:

an upload-destination-address-get-program storage step configured to store an upload-destination-address getting program for getting the upload destination address from the service providing apparatus by using a public API of the electronic-file storing service;

an upload-destination-address getting step configured to, every time when receiving the request for getting the upload destination address from the communication apparatus, get the upload destination address from the service providing apparatus by executing the upload-destination-address getting program;

a time-information adding step configured to, every time when receiving the request for getting the upload destination address from the communication apparatus, determine whether the information on the reception time of the request for getting the upload destination address is necessary based on the upload destination address got by the upload-destination-address getting step, and in a case that it is determined that the information on the reception time of the request for getting the upload destination address is necessary, add information on the reception time of the request for getting the upload destination address to the template for an upload message when necessary; and an upload-destination-address transmitting step configured to transmit the template for an upload message and the upload destination address got by the upload-destination-address getting step to the communication apparatus, every time after the time-information adding step adds the information on the reception time of the request for getting the upload destination address to the template for an upload message.

6. A non-transitory computer-readable medium having a control program stored thereon and readable by a computer for controlling a relay apparatus in a communication apparatus system comprising a communication apparatus and the relay apparatus connected to a network including a service providing apparatus for an electronic-file storing service, the communication apparatus including: an address-get-request transmitting unit configured to transmit a request for getting an upload destination address to the relay apparatus, wherein the upload destination address represents an address of an upload destination of an electronic file in the electronic-file storing service; a receiving unit configured to receive the upload destination address and a template for an upload message from the relay apparatus after the address-get-request transmitting unit transmits the request for getting the upload destination address, wherein the upload message is a message for requesting upload in the electronic-file storing service; an upload-message generating unit configured to generate the upload message including the electronic file and the upload destination address according to the template received by the receiving unit an upload-message transmitting unit configured to transmit the upload message generated by the upload-message generating unit to the service providing apparatus so as to upload the electronic file in the electronic-file storing service; and a remaining-file determining unit configured to determine whether any electronic file to be transmitted in the electronic-file storing service remains after receiving a response message including an upload result from the service providing apparatus having received the upload message, wherein in a case in which the remaining-file determining unit determines that any electronic file remains, the address-get-request transmitting unit transmits the request for getting the upload destination address to the relay apparatus, and said control program of the relay apparatus, when executed by the computer, causes the computer to function as:
- an upload-destination-address-get-program storage unit that stores an upload-destination-address getting program for getting the upload destination address from the service providing apparatus by using a public API of the electronic-file storing service;
- an upload-destination-address getting unit configured to, every time when receiving the request for getting the upload destination address from the communication apparatus, get the upload destination address from the service providing apparatus by executing the upload-destination-address getting program;
- a time-information adding unit configured to, every time when receiving the request for getting the upload destination address from the communication apparatus, determine whether the information on the reception time of the request for getting the upload destination address is necessary based on the upload destination address got by the upload-destination-address getting unit, and in a case that it is determined that the information on the reception time of the request for getting the upload destination address is necessary, add information on the reception time of the request for getting the upload destination address to the template for an upload message when necessary; and
- an upload-destination-address transmitting unit configured to transmit the template for an upload message and the upload destination address got by the upload-destination-address getting unit to the communication apparatus, every time after the time-information adding unit adds the information on the reception time of the request for getting the upload destination address to the template for an upload message.

* * * * *